United States Patent [19] [11] 3,928,593
Lancini et al. [45] Dec. 23, 1975

[54] ANTIVIRAL COMPOSITIONS CONTAINING PIPERAZINE DERIVATIVES AND METHOD OF USE

[75] Inventors: Giancarlo Lancini, Pavia, Italy; Lise Thiry, Brussels, Belgium

[73] Assignee: Gruppo Lepetit S.p.A., Milan, Italy

[22] Filed: Apr. 22, 1971

[21] Appl. No.: 136,558

[30] Foreign Application Priority Data
June 1, 1970  Italy.................................. 25380/70

[52] U.S. Cl. .............................................. 424/250
[51] Int. Cl.² ....................................... A61K 31/495
[58] Field of Search .................................... 424/250

[56] References Cited
OTHER PUBLICATIONS
Lancini et al., J. of Antibiotics, Vol. 24, No. 1, Jan. 1971, pp. 64–66.

*Primary Examiner*—Stanley J. Friedman
*Attorney, Agent, or Firm*—Theodore Post; C. Kenneth Bjork

[57] ABSTRACT

Compositions and methods for controlling viral infections comprising a piperazine compound corresponding to the formula

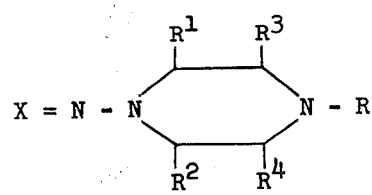

wherein R represents hydrogen, lower alkyl, lower acyl or phenyl-lower-alkyl; $R^1$, $R^2$, $R^3$ and $R^4$ each represents hydrogen or lower alkyl; each of the pairs $R^1$ and $R^2$ or $R^3$ and $R^4$ may also represent a lower alkylene group bridging the piperazine ring; X is selected from $H_2$, benzylidene and (H, lower acyl); and pharmaceutically acceptable acid addition salts of such compounds.

7 Claims, No Drawings

ANTIVIRAL COMPOSITIONS CONTAINING PIPERAZINE DERIVATIVES AND METHOD OF USE

SUMMARY OF THE INVENTION

This invention concerns methods and compositions for treating viral infections. In particular the invention consists of methods for treating viral infections with, and antiviral compositions containing a compound represented by the following formula

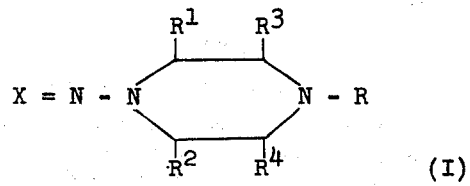

(I)

wherein R represents hydrogen, lower alkyl, lower acyl or phenyl-lower-alkyl; $R^1$, $R^2$, $R^3$ and $R^4$ each represents hydrogen or lower alkyl; each of the pairs $R^1$ and $R^2$ or $R^3$ and $R^4$ may also represent a lower alkylene group bridging the piperazine ring; and X is selected from $H_2$, benzylidene and (H, lower acyl).

Also included within the scope of the present invention are methods utilizing and compositions containing pharmaceutically acceptable acid addition salts of the compounds of foregoing formula (I). In the specification and claims, the term "lower alkyl" refers to straight and branched chain alkyl groups containing from 1 to 4 carbon atoms, such as, for example, methyl, ethyl, propyl, isopropyl, n-butyl, isobutyl and t-butyl; the terms "lower acyl" and "lower alkylene" refer to groups containing from 2 to 4 carbon atoms, such as, for example, acetyl, propionyl and butyryl; and ethylene, propylene and butylene, respectively.

The compounds useful in the herein-described compositions and methods are prepared in known ways. For example, the preparation of 3-amino-8-methyl-3,8-diazabicyclo [3.2.1] octane, which has the following structural formula:

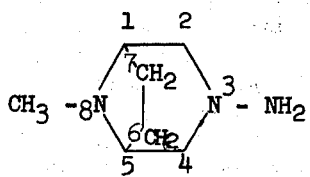

is known from Cignarella et al. J. Med. Chem. 6, 385, (1963). Also the isomeric 8-amino-3-methyl-derivative is described by the same author in the J. Med. Chem. 6, 29 (1963). Aminopiperazine compounds and their preparation are disclosed in U.S. Pat. No. 2,663,706. Other derivatives of this series may be prepared by known methods. Thus, in the case where X in the general formula stands for (H, acyl) the compound is obtained simply by acylating the corresponding compounds having a free amino group. The compounds encompassed by the general formula where the R group is acyl or alkyl and X stands for $H_2$ are obtained according to a general method disclosed in U.S. Pat. No. 2,663,706. The benzylideneamino derivatives are readily obtained by reacting the free aminopiperazine compounds with benzaldehyde in a conventional way.

DESCRIPTION OF THE PREFERRED EMBODIMENTS

The following examples describe representative specific embodiments and the best mode contemplated by the inventors for carrying out the invention, including the preparation of representative active aminopiperidine compounds.

EXAMPLE 1

1-Benzylidenaminopiperazine

To a solution containing 7.8 g. of piperazine hexhydrate in 20 ml. of water add 8 ml. of concentrated hydrochloric acid, and, while maintaining the temperature at about 5°–10°C., add 2.8 g. of $NaNO_2$ in 8 ml. $H_2O$ slowly. The mixture is allowed to stand for 3 hours at 10°C, then impurities are filtered off. The resulting aqueous solution is adjusted to pH 12 with aqueous sodium hydroxide, then is extracted several times with chloroform. The organic phase is evaporated to give 3.4 g. of the nitrosamine derivative which is then reduced. The reduction of the nitrosamine derivative is carried out in aqueous solution according to the method of G. W. Smith et al., Ind. Eng. Chem., Prod. Res. & Dev., Vol. 1, No. 2, 117 (1962). To the hydrogenated solution initially containing 3.4 g. of crude nitrosamine derivative, add 3.15 g. of benzaldehyde dissolved in 15 ml. of ethanol. After standing for 24 hours at room temperature, the resulting mixture is extracted with benzene. Upon evaporation of the organic layer, 4.4 g. of 1-benzylideneaminopiperazine, melting at 74°–76°C, is obtained.

EXAMPLE 2

1-Aminopiperazine 4.4 Grams of 1-benzylideneaminopiperazine is refluxed for 2 hours in an aqueous solution containing 4.7 ml. of concentrated HCl. After cooling, the mixture is extracted with benzene and then the aqueous layer is evaporated in vacuo. The residue is crystallized from aqueous methanol. A yield of 4 g. of 1-aminopiperazine dihydrochloride monohydrate is thereby obtained. The free base is then liberated with alkali from the hydrochloride in a conventional manner. The product is recovered by vacuum distillation at 58°–60°C at 0.3 mm Hg.

EXAMPLE 3

1Acetamido-4-methylpiperazine

1-Amino-4-methylpiperazine is treated with an excess of acetic anhydride for about 3 hours and after distilling excess acetic anhydride in vacuo, is treated with water and neutralized with sodium carbonate. The aqueous layer is then concentrated in vacuo and the inorganic salts which precipitate are filtered off. The final residue is washed with diethyl ether and then crystallized from benzene to give the titular product, m.p. 148°–150°C.

EXAMPLE 4

4-Benzylideneamino-1-methylpiperazine 3.8 Grams of 4-amino-1-methylpiperazine is dissolved in water and after having brought the solution to pH 4 with hydrochloric acid, 3.15 g. of benzaldehyde is added. The mixture is maintained for 15 minutes at 50°C, then cooled and washed with diethyl ether. The organic layer upon evaporation gives 4-benzylideneamino-1-methylpiperazine, m.p. 56°–57°C.

EXAMPLE 5

3-Methyl-8-propionamido-3,8-diazabicyclo[3.2.1] octane

The compound is prepared according to the method described in Example 3, substituting 8-amino-3-methyl-3,8-diazabicyclo[3.2.1] octane in place of 1-amino-4-methylpiperazine and propionic anhydride in place of acetic anhydride. Yield 74%; m.p. 133°–135°C.

EXAMPLE 6

8-Amino-3-propionyl-3,8-diazabicyclo[3.2.1] octane

To 68 ml. of aqueous 18% HCl cooled to 0°C, add dropwise 18.6 g. of 3-propionyl-3,8-diazabicyclo[3.2.1] octane. While maintaining the temperature between 0° and +5°C, add dropwise 9.6 g. of sodium nitrite dissolved in 15 ml. of water. The mixture is stirred for three hours at room temperature. Then add to the mixture 4.8 g. of sodium nitrite and 20 ml. of aqueous 18% HCl. The resulting mixture is stirred for 3 more hours at room temperature, then is made alkaline with aqueous 30% NaOH and extracted thoroughly with ether. The ethereal extracts are dried over $Na_2SO_4$ and evaporated to dryness to give a residue which is vacuum distilled at 150°–153°C at 0.5 mm Hg, yield 83%. The nitrosamine distillation product (25 g., 0.127 mole) dissolved in 42 ml. (0.72 mole) of acetic acid is added dropwise to a suspension of 35 g. of powdered Zn (0.536 mole) in 50 ml. of water, maintaining the temperature between +10° and +20°C. The mixture is stirred for 1 hour at room temperature, the insoluble precipitate is filtered off, washed on the filter with a small amount of aqueous 5% HCl, the filtrate is made alkaline with cooled aqueous 30% NaOH then thoroughly extracted with chloroform. The chloroform extract is dried over $Na_2SO_4$ and evaporated to dryness. The residue is distilled, yielding 16 g. of 8-amino-3-propionyl-3,8-diazabicyclo[3.2.1] octane, b.p. 145°C at 0.6 mm Hg.

EXAMPLE 7

3-Amino-8-propionyl-3,8-diazabicyclo[3.2.1] octane

The compound is prepared according to the method described in Example 6, substituting 8-propionyl-3,8-diazabicyclo[3.2.1]octane in place of 3-propionyl-3,8-diazabicyclo[3.2.1]octane. 3-Amino-8-propionyl-3,8-diazabicyclo[3.2.1]octane is thereby obtained in a 61% yield, b.p. 110°C at 0.6 mm Hg.

EXAMPLE 8

1-Amino-4-benzyl-2,6-dimethylpiperazine

By following the method as described in the first part of Example 6, substituting as starting material 4-benzyl-2,6-dimethylpiperazine in place of 3-propionyl-3,8-diazabicyclo[3.2.1]octane, 4-benzyl-2,6-dimethyl-1-nitrosopiperazine is obtained in a 77% yield, b.p. 140°–145°C at 0.6 mm Hg. 24 Grams of the nitroso derivative in 50 ml. of anhydrous tetrahydrofuran is added dropwise to a suspension of 9.5 g. of lithium aluminum hydride in 700 ml. of tetrahydrofuran, maintaining the temperature at about 45°C. The resulting suspension is then refluxed for 7 hours, cooled to −5°C and treated with 30 ml of water. The organic layer is separated, dried over $Na_2SO_4$ and after evaporation of the solvent the residue is distilled at 120°–122°C/0.8 mm Hg to give 18.7 g. of the titular compound.

EXAMPLE 9

1-Amino-4-ethylpiperazine

The compound is prepared according to the method of Example 8, using as starting material 4-ethylpiperazine in place of 4-benzyl-2,6-dimethylpiperazine. The titular product so obtained boils at 75° to 80°C at 15 mm Hg.

EXAMPLE 10

1-Amino-4-propylpiperazine

The compound is prepared according to the method of Example 8, using as starting material 4-propylpiperazine in place of 4-benzyl-2,6-dimethylpiperazine. The titular product so obtained boils at 96° to 98°C at 15 mm Hg.

EXAMPLE 11

1-Amino-4-(3-phenylpropyl)piperazine

15 Grams of 1-nitrosopiperazine in 100 ml. of 95% ethanol is reacted for one hour with 29 g. of 3-chloropropylbenzene in the presence of 30 g. of sodium bicarbonate. After filtering off the inorganic precipitate, the solution is evaporated and the residue is dissolved in chloroform. The chloroform solution is chromatographed on a silica gel column (eluent $CHCl_3:CH_3OH$ 99.5:0.5), giving 7 g. of the nitroso derivative. The nitroso derivative is reduced with lithium aluminum hydride as in the procedure of Example 8 to give 3.8 g. of 1-amino-4-(3-phenylpropyl)-piperazine, b.p. 117°–120°/0.2 mm Hg.

EXAMPLE 12

1-Amino-4-phenethylpiperazine

The compound is prepared according to the method of Example 11, substituting 2-chloroethylbenzene in place of 3-chloropropylbenzene. The titular product obtained has a boiling point of 108°–110°C/0.6 mm Hg.

The compositions useful in this invention may contain, in addition to the active compound, one or more of the usual pharmaceutical carriers or excipients such as stabilizers, thickening agents, surfactants and solvents, such as, for example, sugars, cellulose derivatives, starches, polyoxyethylene derivatives, p-hydroxybenzoates, magnesium stearate, sodium metabisulfite, pyrogen-free distilled water, which render them suitable for oral, or intranasal and parenteral administration. For oral administration, the active ingredient is compounded into tablets or capsules in doses of about from 100 mg. to about 1 g. For intranasal administration, a suspension or solution of the active ingredient is advantageous.

A representative tablet has the following composition:

| | |
|---|---|
| Active antiviral compound | 200 mg. |
| Mannitol | 20 mg. |
| Starch | 40 mg. |
| Magnesium stearate | 5 mg. |

A representative solution or suspension suitable for parenteral administration has the following percent composition:

|  | Percent w/v |
|---|---|
| Active antiviral compound | 5.000 |
| Sodium metabisulfite | 1.000 |
| Methyl p-hydroxybenzoate | 0.050 |
| Propyl p-hydroxybenzoate | 0.010 |
| Pyrogen free distilled water q.s. ad | 100.000 |

A representative intranasal spray has the following composition:

| Active antiviral compound | 5 g. |
|---|---|
| Thimerosal | 2 mg. |
| Methyl p-hydroxybenzoate | 80 mg. |
| Propyl p-hydroxybenzoate | 20 mg. |
| Sodium phosphate | 500 mg. |
| E.D.T.A. disodium salt | 5 mg. |
| Pyrogen free distilled water q.s. ad | 100 ml. |

The antiviral activity of the compositions and methods using said compounds, within the scope of this invention, are demonstrated by plague formation inhibition in cultures of chick embryo fibroblasts infected with vaccinia virus and cultures of rabbit kidneys infected with herpes simplex virus. The compositions and method are also useful for prophylactic purposes. It should be noted that other typical animal viruses such as sheep-pox, fowl-pox, feline and bovine rhinotracheitis, belong to these groups and are similarly controllable. In representative operations, the direct inhibitive effect of the active compounds on plaque formation by the viruses was tested in the following ways.

A. Under Agar

Virus was adsorbed on monolayers of primary cultures of chick embryo fibroblasts, and the resulting cellular sheet was then overlaid with agar containing nutrient medium and the active compound. After 4 days incubation at 37°C, neutral red was added and the plaques were counted 3 hours later.

B. In Liquid Medium

The same cells were used and grown in Leighton tubes. After virus adsorption (one PFU per 1 to 3 cells) the cells were washed and 1 ml. of nutrient medium containing the active compound was added. 48 Hours later the cells plus fluid were frozen at −70°C. The virus was titrated after breaking the cells by three freezethaw cycles and 30 seconds treatment with sonic waves. The number of PFU was determined by counting the plaques as in the method under agar. The results were compared with control cultures.

C. Under Methylcellulose

In the case of herpes simplex virus, primary cultures of rabbit kidneys were used. The same method as under (a) was used, except that 2 percent methylcellulose was used instead of agar.

The active compounds have a very limited toxicity toward cells. Representative compounds have been found to be non-toxic even at concentrations five times greater than that which produces significant inhibition of viral growth when determined according to the agar method described above with exclusion of virus, and by taking into consideration the product concentration which inhibits staining of the cells by neutral red.

The following Table summarizes representative results obtainable in terms of virus replication inhibition with representative active compounds in accordance with the methods and compositions of the invention as determined using foregoing procedures (a), (b) and (c).

TABLE I

| | Concentration Which Gives 90% Inhibition of Viral Growth (μg/ml.) | | |
|---|---|---|---|
| | VACCINIA | | HERPES SIMPLEX |
| COMPOUND | Under Agar | In Liquid Medium | Under Methylcellulose |
|  | 100 | 200–300 | — |
| 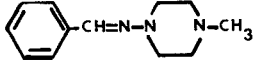 | 100 | 200–300 | — |
| 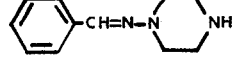 | 5 | — | 20 |
| 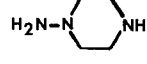 | 30 | 20 | 20 |
| 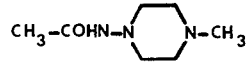 | 200 | — | 20 |
| 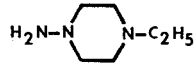 | — | 20 | — |
|  | — | 20 | — |

TABLE I-continued

Concentration Which Gives 90% Inhibition of Viral Growth
(µg/ml.)

| COMPOUND | VACCINIA | | HERPES SIMPLEX |
|---|---|---|---|
| | Under Agar | In Liquid Medium | Under Methylcellulose |
| H₂N-N(CH₃)(N-CH₂-Ph)(CH₃) [1-amino-4-benzyl-2,6-dimethylpiperazine] | 2–5 | 10 | 10 |
| H₂N-N⟨⟩N-CH₃ | — | 100 | — |
| H₂N-N⟨⟩N-CH₃ | — | 100 | — |
| C₂H₅-CONH-N⟨⟩N-CH₃ | — | 100 | — |
| H₂N-N⟨⟩N-COC₂H₅ | 200 | — | — |
| H₂N-N⟨⟩N-COC₂H₅ | 50 | — | — |
| H₂N-N⟨⟩N-CH₂-CH₂-CH₂-Ph | 20 | — | 20 |
| H₂N-N⟨⟩N-CH₂-CH₂-Ph | 50 | — | 50 |

The compounds which are the active antiviral constituents of these compositions when tested in animals displayed a high degree of activity even at doses less than 90 mg/kg. by parenteral route. In representative operations, compounds of Examples 4 and 8 were tested intraperitoneally at a dose of 10 mg/kg. in mice infected with vaccinia virus. Lesions of vaccinia were counted on the tails of the mice eight days after the initial vaccinia injection. The average number of lesions in the treated animals was compared with that of the controls. Compounds of Examples 4 and 8 reduced the average number of lesions to 17.8 and 13.6, respectively, as against 23 for the controls.

What is claimed is:

1. A method for inhibiting the replication of an animal virus selected from the group consisting of vaccinia and herpes simplex viruses which comprises administering to an animal host having cells susceptible to invasion by said virus an antiviral effective amount of a compound corresponding to the formula

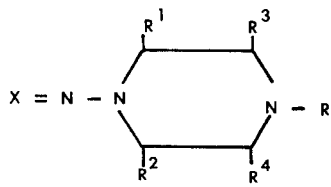

wherein R represents hydrogen, lower alkyl, 2 to 4 carbon alkanoyl or phenyl-lower-alkyl; $R^1$, $R^2$, $R^3$ and $R^4$ each represents hydrogen or lower alkyl; X is selected from the group consisting of $H_2$, benzylidene, and (H, 2 to 4 carbon alkanoyl); and a pharmaceutically acceptable acid addition salt thereof.

2. Method as claimed in claim 1 wherein the compound is 1-amino-4-benzyl-2,6-dimethylpiperazine.

3. Method as claimed in claim 1 wherein the compound is selected from the group consisting of 1-benzylidenaminopiperazine, 1-aminopiperazine, 1-acetamido-4-methylpiperazine, 4-benzylideneamino-1-methylpiperazine, 1-amino-4-benzyl-2,6-dimethylpiperazine, 1-amino-4-ethylpiperazine, 1-amino-4-propylpiperazine, 1-amino-4-(3-phenylpropyl)piperazine and 1-amino-4-phenethylpiperazine.

4. Method as claimed in claim 1 wherein the compound is selected from the group consisting of 1-benzylidenaminopiperazine, 1-aminopiperazine, 1-amino-4-benzyl-2,6-dimethylpiperazine, 1-amino-4-(3-phenylpropyl)piperazine and 1-amino-4-phenethylpiperazine.

5. A method for inhibiting the replication of an animal virus selected from the group consisting of vaccinia and herpes simplex viruses which comprises orally, intranasally or parenterally administering to an animal infected with said virus an antiviral effective amount of a compound corresponding to the formula

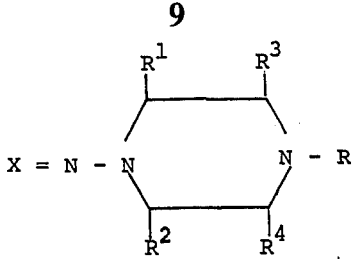

wherein R represents hydrogen, lower alkyl, 2 to 4 carbon alkanoyl or phenyl-lower-alkyl; $R^1$, $R^2$, $R^3$ and $R^4$ each represents hydrogen or lower alkyl; X is selected from the group consisting of $H_2$, benzylidene, and (H, 2 to 4 carbon alkanoyl); and a pharmaceutically acceptable acid addition salt thereof.

6. Method as claimed in claim 5 wherein the compound is selected from the group consisting of 1-benzylidenaminopiperazine, 1-aminopiperazine, 1-acetamido-4-methylpiperazine, 4-benzylideneamino-1-methylpiperazine, 1-amino-4-benzyl-2,6-dimethylpiperazine, 1-amino-4-ethylpiperazine, 1-amino-4-propylpiperazine, 1-amino-4-(3-phenylpropyl)piperazine and 1-amino-4-phenethylpiperazine.

7. Method as claimed in claim 5 wherein the compound is selected from the group consisting of 1-benzylidenaminopiperazine, 1-aminopiperazine, 1-amino-4-benzyl-2,6-dimethylpiperazine, 1-amino-4-(3-phenylpropyl)piperazine and 1-amino-4-phenethylpiperazine.

* * * * *